United States Patent [19]
Kita et al.

[11] Patent Number: 5,291,027
[45] Date of Patent: Mar. 1, 1994

[54] OPTICAL IDENTIFICATION MULTIPLE DIFFRACTION GRATING MARK MEMBER AND CARD USING THE SAME

[75] Inventors: Takehide Kita, Sugito; Akihiko Kobayashi, Shiki; Susumu Takahashi, Matsudo; Toshiki Toda, Satte, all of Japan

[73] Assignee: Toppan Printing Co., Ltd., Tokyo, Japan

[21] Appl. No.: 910,506

[22] Filed: Jul. 8, 1992

[51] Int. Cl.⁵ .................................. G06K 7/10
[52] U.S. Cl. .................................. 250/566; 235/487
[58] Field of Search .............. 250/556, 566, 568, 569, 250/570; 235/487, 494

[56] References Cited

U.S. PATENT DOCUMENTS

| | | | |
|---|---|---|---|
| 3,749,922 | 7/1973 | Meeussen | 250/566 |
| 4,011,435 | 3/1977 | Phelps et al. | 235/487 |
| 4,023,010 | 5/1977 | Horst et al. | 235/487 |
| 4,870,260 | 9/1989 | Niepolomski et al. | 235/454 |
| 5,058,992 | 10/1991 | Takahashi . | |
| 5,101,184 | 3/1992 | Antes | 235/487 |

FOREIGN PATENT DOCUMENTS 3-71383 3/1991 Japan .

*Primary Examiner*—David C. Nelms
*Attorney, Agent, or Firm*—Armstrong, Westerman, Hattori, McLeland & Naughton

[57] ABSTRACT

An identification mark comprises a set of a plurality of mark elements. One mark element is divided into a large number of first and second fine square regions alternately arranged. One or two basic gratings selected from a plurality of types of basic gratings is/are drawn in both fine square regions, so that patterns are formed. Since the basic gratings are different in direction of the grating or spatial frequency, the types of the basic gratings are different from each other. One selected type of basic gratings is drawn in all first fine square regions. Similarly, the one or another type of basic gratings is drawn in all second fine square regions. At least one first fine region and at least one second fine region exist in the diameter of the light beam when light is radiated on the mark element for optical read. Thereby, types of patterns, which one mark element can obtain, are increased.

22 Claims, 7 Drawing Sheets

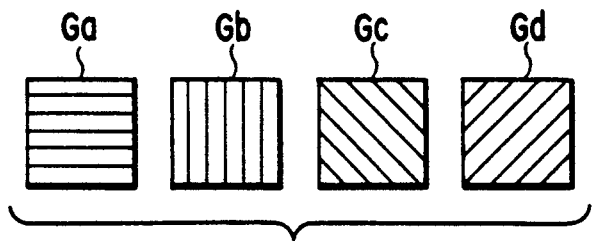
F I G. 3
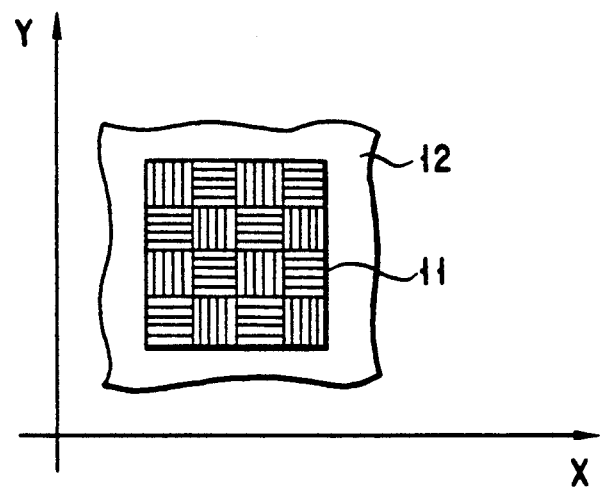
F I G. 4
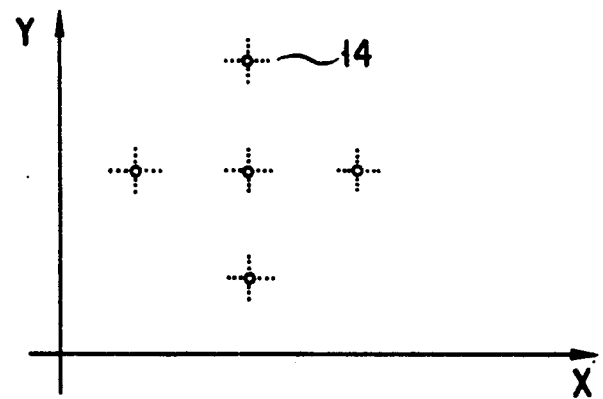
F I G. 5

OPTICAL IDENTIFICATION MULTIPLE DIFFRACTION GRATING MARK MEMBER AND CARD USING THE SAME

BACKGROUND OF THE INVENTION

1. Field of the Invention

The present invention relates to an optically readable identification mark member and a card using such an optical identification mark member, and more particularly to a card such as a credit card, a prepaid card in which a seal for prevention of fake product or fake prevention treatment is provided.

2. Description of the Related Art

There has been disclosed a technique in which diffraction grating patterns are added to a card as information recording means or these identification marks are optically read, thereby the card is identified. Published Unexamined Japanese Patent Application (PUJPA) 3-71383 (Nishiruma et al.) discloses an optical identification mark using a holographic diffraction grating, and its reading technique.

FIG. 1 shows one example of diffraction grating patterns based on the concept disclosed in the above PUJPA 3-71383. The identification mark comprises a plurality of mark elements such as four mark elements 1a to 1d as shown in the drawing. Each mark element has its own diffraction grating pattern. Such a diffraction grating pattern can be produced by, for example, using a two-beam laser and exposing a photosensitive film with fine interference fringes generated by interference of the two beams.

Reading the mark elements is performed by radiating the laser beam to each element sequentially from the right above and detecting the diffracted light by a plurality of sensors, such as photodiodes. Then, one signal is formed by the diffracted light from each element, and the identification mark, which is formed of a set of four element, is discriminated by the types of plurality of signals, for example, four signals as shown in the drawing, and the order thereof. The own signal, which each element has, is determined based on the principle to be explained as follows.

A first factor concerns a relationship between the direction of the grating pattern and that of the diffracted light. The diffracted light returns to a direction perpendicular to the lines of the gratings. Due to this, if the directions of the grating of elements are different from each other at 90°, as in the case between the elements 1a and 1b in FIG. 1, the directions to which the diffracted light return are different from each other at 90° in the plane. With reference to FIGS. 6 and 7, the relationship between the direction of the grating and that of the diffracted light can be understood, though they show the outline of an apparatus used in the present invention.

A second factor concerns a relationship between a spatial frequency of the pattern grating, that is, pitches of lines, and the diffraction angle of the diffracted light. As the spatial frequency of the grating is higher, that is, the pitches of the lines are narrower, the diffraction angle becomes larger. Therefore, as in the case between the elements 1b and 1c in FIG. 1, if the pitches of the lines of the gratings of elements are different from each other, the diffraction angles of the respective diffracted light differ from each other. With reference to FIGS. 16 and 17, the relationship between the spatial frequency of the grating and the diffraction angle of the diffracted light can be understood, though they show the outline of an other apparatus used in the present invention.

However, as shown in FIG. 1, in a case where an identification mark is formed of mark elements having diffraction grating patterns, following problems occur.

Specifically, if the types of patterns are increased in order to increase the types of signals which the mark elements can obtain, the number of sensors (e.g., photodiodes) must be increased in proportion to the number of patterns. If the number of sensors is increased, there occur problems in that the cost of the reading apparatus is increased and reading errors are easily generated.

SUMMARY OF THE INVENTION

An object of the present invention is to increase types of signals, which mark elements formed of diffraction grating patterns can have, without largely increasing the number of sensors of the reading apparatus. The present invention provides an identification mark member having diffraction grating patterns and a card using such an identification mark member.

The outline of the present invention is that at least two different diffraction gratings are drawn in one mark element of the identification mark member so that a pattern is formed. When light is radiated on the mark element for optical read, all types of gratings must exist in the diameter of the light beam at the same time. According to the first viewpoint of the present invention, at least two gratings having different directions are formed in one mark element. According to the second viewpoint of the present invention, at least two gratings having different spatial frequencies are formed in one mark element.

Preferably, the diffraction gratings consist of first and second gratings selected from a plurality of types of basic gratings. The mark element is divided into a large number of first and second square fine regions, which are alternately arranged. The first grating is formed in only the first fine regions, and the second grating is formed in only the second fine regions. When light is radiated on the mark element for optical read, at least one first fine region and one second fine region are formed in the diameter of the light beam at the same time.

According to the present invention, the number of types of diffraction grating patterns can be increased without largely increasing the number of sensors of the reading apparatus. Therefore, it is possible to solve the problems in which the cost of the reading apparatus is increased and reading errors are easily generated. Even in the identification mark formed of the same number of mark elements, the number of types of patterns which one mark element can have is large, so that information volume, which can be carried by the identification mark, is considerably increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention.

FIG. 3 is a view showing a basic grating used in the patterns of FIG. 2;

FIG. 4 is a view showing a state that a mark element is formed by use of one of the patterns of FIG. 2;

FIG. 5 is a view showing a diffracted light pattern derived from the pattern of the mark element of FIG. 4;

DETAILED DESCRIPTION OF THE PREFERRED EMBODIMENT

Figure 1:
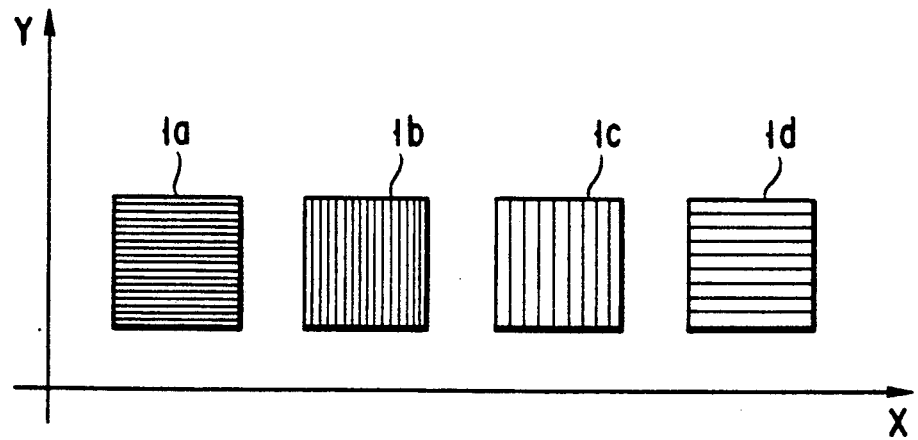
FIG. 1 is a view showing an identification mark using a conventional diffraction grating pattern.
Figure 2:
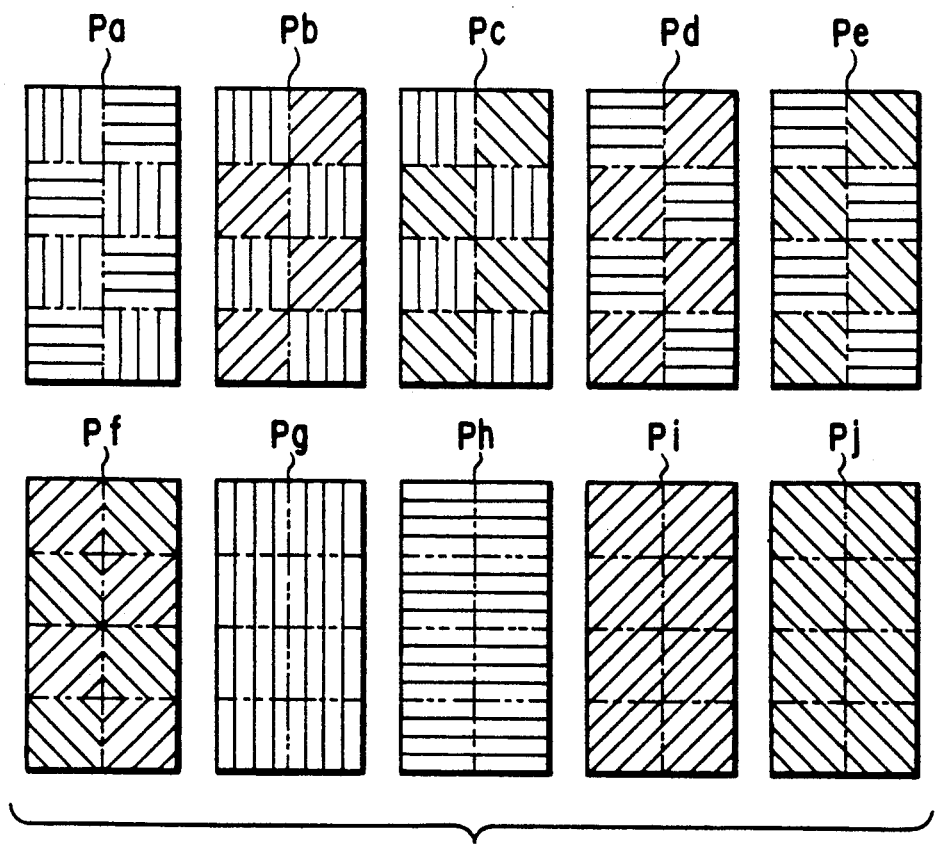
FIG. 2 is a view showing patterns according to a first embodiment of the present invention.

FIG. 2 is a view showing patterns Pa to Pj according to the first embodiment of the present invention. In this embodiment, four basic gratings Ga to Gd, as shown in FIG. 3, are used. The basic gratings Ga to Gd have the same spatial frequencies and the different directions. The patterns Pa to Pf are formed by selecting two of the basic gratings Ga to Gd while the other patterns Pg to Pj are formed by using only one of the basic gratings. Thereby, the ten patterns Pa to Pj can be used. It is preferable that the directions of the basic gratings Ga to Gd are largely different from each other in order to prevent reading errors from occurring. Therefore, if four basic gratings are used, these four basic gratings are preferably shifted at every 45°.

It is preferable that the boundary lines among the basic gratings of patterns Pa to Pj, that is, the boundary lines forming the fine square regions, cannot be optically detected so as not to exert influence on diffraction. In the embodiment, the boundary lines are virtual lines, and actually such lines do not exist. Moreover, the spatial frequencies of the grating, that is, the pitches of the lines, are coarsely shown for convenience. In actual, the pitches are finer and the number of lines exist in one fine region is large.

According to present invention, one pattern is selected from the patterns Pa to Pj, and used in a mark element 11 in a state as shown in FIG. 4. In 16 fine square regions formed by dividing the mark element 11, the basic grating Ga whose line direction is parallel to an X axis and the basic grating Gb whose line direction is parallel to a Y axis are alternately formed, so that the pattern Pa is formed. The very important point is that the pattern Pa is formed such that two basic gratings exist in the diameter of a light beam to be explained later. In other words, when the mark element 11 is irradiated with light for optical read, all types of gratings (not all gratings) must exist in the diameter of the light beam.

Figure 6:
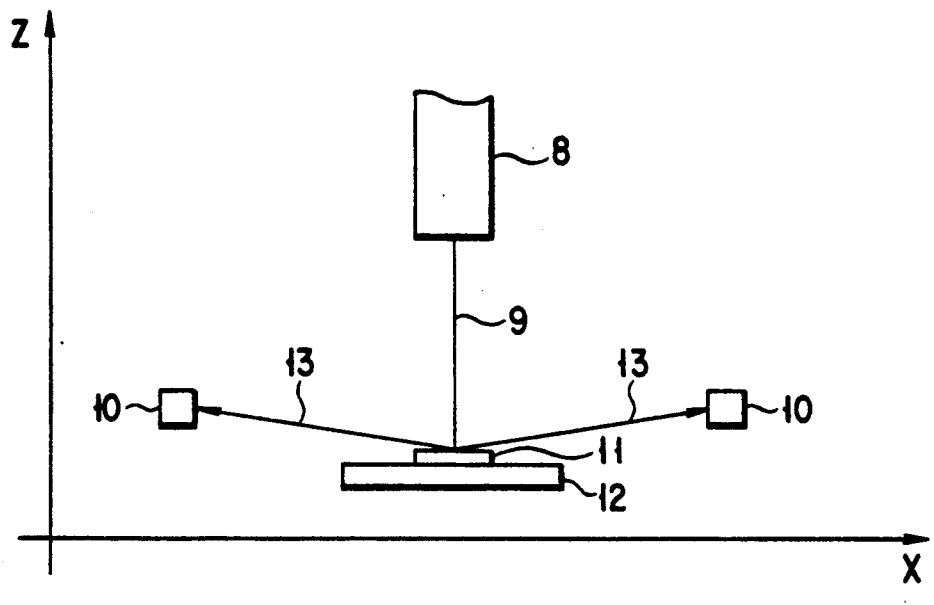
FIGS. 6 and 7 are a side view and a plane view, respectively, showing an outline of an apparatus for optically reading the pattern of the first embodiment of the present invention.
Figure 7:
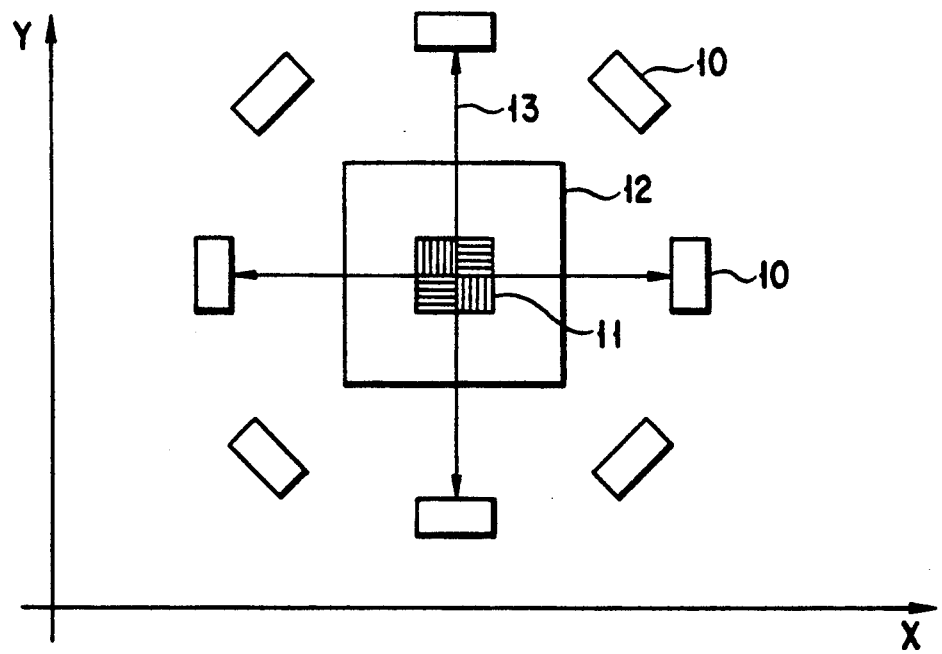

FIGS. 6 and 7 are a side view and a plane view, respectively, showing an outline of an apparatus for optically reading the pattern of the first embodiment of the present invention.

Figure 8:
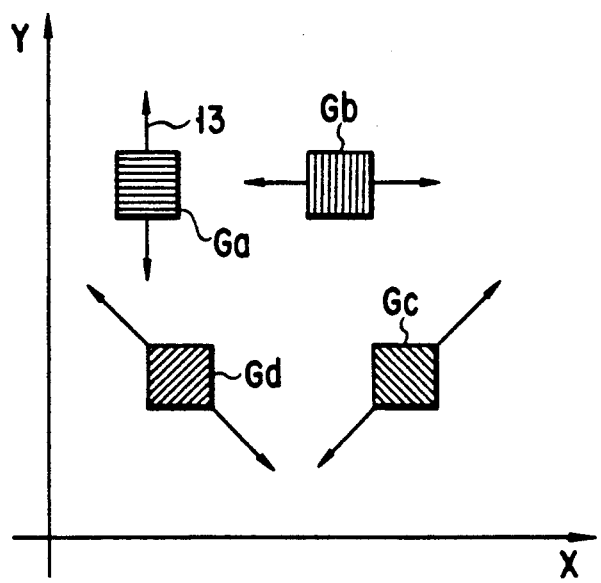
FIG. 8 is a view explaining a relationship between the direction of the diffraction grating and that of the diffracted light.

In this apparatus, an object, for example, a card 12 on which the mark element 11 is formed, is placed just below a laser oscillator 8. A laser beam 9 is perpendicularly radiated on the mark element 11 from the laser oscillator 8, and its diffracted light 13 is detected by sensors, such as photodiodes 10. The spatial frequencies of the four basic gratings Ga to Gd of the patterns of the first embodiment are the same, and the directions are different at every 45°. Therefore, the diffracted lights 13 due to the basic gratings Ga to Gd have substantially the same diffraction angle, and different directions shifted at every 45° as shown in FIG. 8. This is because the diffracted light 13 is diffracted in a direction perpendicular to the direction of the grating, and returned. Therefore, eight sensors 10 are circularly arranged with an even distance in the same horizontal plane.

According to the above embodiment, the sensors are arranged in accordance with four basic gratings Ga to Gd, so that 10 patterns Pa to Pj can be discriminated. For example, on the assumption that one mark element is formed of only one of the four basic gratings Ga to Gd and an identification mark is formed of a set of four mark elements, the number of the identification mark is $4^4$ on the basis of repeated permutation. In contrast, in a case where an identification mark is formed of a set of four mark elements by using the patterns of the first embodiment of the present invention, the number of the identification is $10^4$ on the basis of repeated permutation.

EXAMPLE 1

The mark element 11 having the pattern shown in FIG. 4 was formed on the card 12. The contour of the mark element 11 was a square of 2 mm $\times$ 2 mm. The size of the small squares in the pattern of the mark element 11 was 0.05 mm $\times$ 0.05 mm. The spatial frequencies of the gratings Ga and Gb were 700 line/mm.

The mark element 11 was manufactured by the following method.

Figure 9:
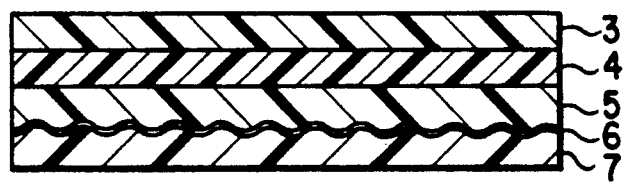
FIG. 9 is a cross sectional view showing a transfer foil having a diffraction pattern.

A dry plate having the pattern of the mark element 11 was manufactured. The dry plate was used as an original plate, and a transfer foil was prepared by a well-known embossing method. FIG. 9 shows one example of the structure of the transfer foil. In the transfer foil, a diffraction grating pattern forming layer 5, a metal deposition layer 6, and a bonding layer 7 were sequentially formed on a PET base (polyethylene telephthalate) 3 via a peeling layer 4. The transfer foil was transferred to a vinyl chloride card by a transferring method such as a thermal transferring method, thereby obtaining a card.

Then, the diffracted light of the mark element 11 was obtained by the reading apparatus shown in FIGS. 6 and 7. The diffracted light pattern, which was seen from the cross section parallel to the plane of the mark element 11, was as shown in FIG. 5. In the drawing, reference numeral 14 is a light spot. The pattern discrimination was satisfactorily performed when the mark element 11 was used in the reading apparatus.

Comparison 1

Figure 10:
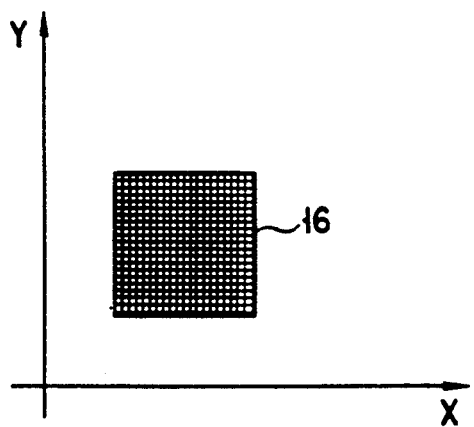
FIG. 10 is a view showing a mark element formed of a pattern which has a plurality of diffraction gratings prepared by a multi-exposing method.

As a comparison, a mark element 16 having a pattern shown in FIG. 10 was formed on a card. A plurality of diffraction gratings were formed in the mark element 16 by use of a multi-exposing method, in which the spatial frequencies and directions of the gratings are desirably controlled with interference of two beams of a two-beam laser. Similar to the mark element 11 of FIG. 4, two basic gradings Ga and Gb whose directions are perpendicular to each other were used. However, in this comparison, both gratings were formed to be overlapped each other. The contour of the mark element 16 was a square of 2 mm × 2 mm. The spatial frequencies of the gratings Ga and Gb were 700 line/mm.

Figure 11:
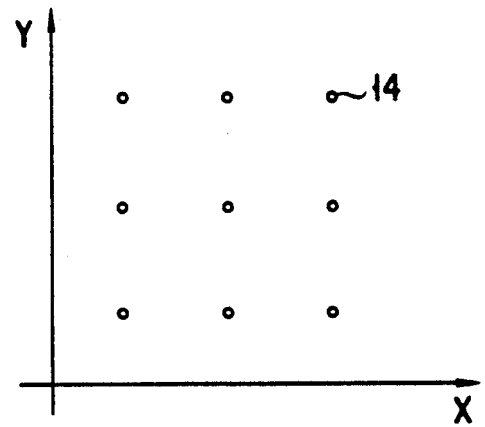
FIG. 11 is a view showing a diffracted light pattern derived from the pattern of the mark element of FIG. 10.

The diffracted light of the mark element 16 was obtained by the reading apparatus shown in FIGS. 6 and 7. The diffracted light pattern, which was seen from the cross section parallel to the plane of the mark element 16, was as shown in FIG. 11. In the drawing, reference numeral 14 is a light spot. In the diffraction light pattern, diffracted light was generated by the cross points of the basic gratings. More specifically, not only diffracted light which each basic grating has but also diffracted light due to interaction of the gratings was generated. Therefore, it was found out that an reading error occurs when the mark element 16 was used in the reading apparatus.

Figure 12:
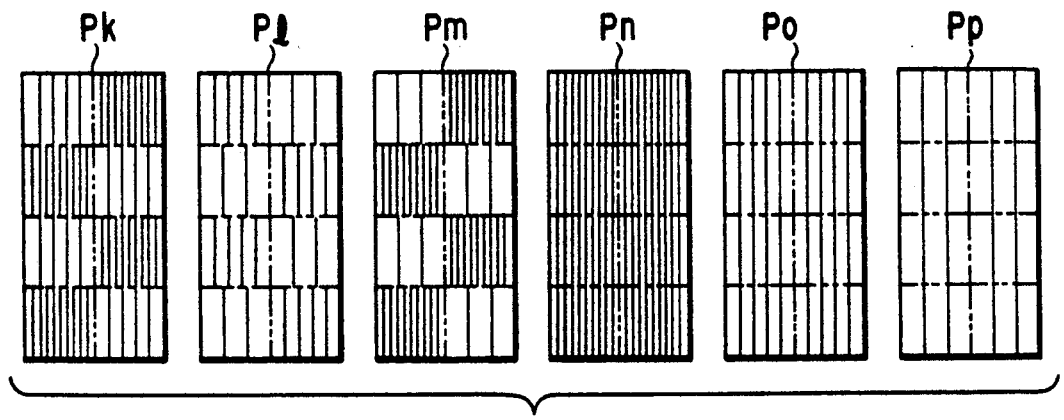
FIG. 12 is a view showing patterns according to a second embodiment of the present invention.
Figure 13:
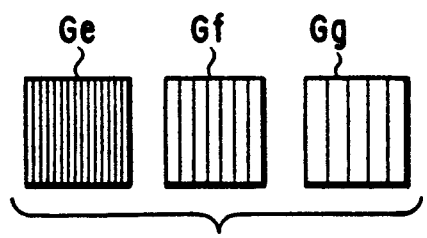
FIG. 13 is a view showing a basic grating used in the patterns of FIG. 12.

FIG. 12 is a view showing patterns Pk to Pp according to the second embodiment of the present invention. In this embodiment, three basic gratings Ge to Gg, as shown in FIG. 13, are used. The basic gratings Ge to Gg have the same directions and the different spatial frequencies. The patterns Pk to Pm are formed by selecting two of basis gratings Ge to Gg while the other patterns Pn to Pp are formed by using only one of the basic gratings. Thereby, the six patterns Pk to Pp can be used. It is preferable that the spatial frequencies of the basic gratings Ge to Gg are largely different from each other in order to prevent reading errors from occurring.

It is preferable that the boundary lines among the basic gratings of patterns Pk to Pp, that is, the boundary lines forming the fine square regions, cannot be optically detected so as not to exert influence on diffraction. In the embodiment, the boundary lines are virtual lines, and actually such lines do not exist. Moreover, the spatial frequencies of the grating, that is, the pitches of the lines, are coarsely shown for convenience. In actual, the pitches are finer and the number of lines exist in one fine region is large.

Figure 14:
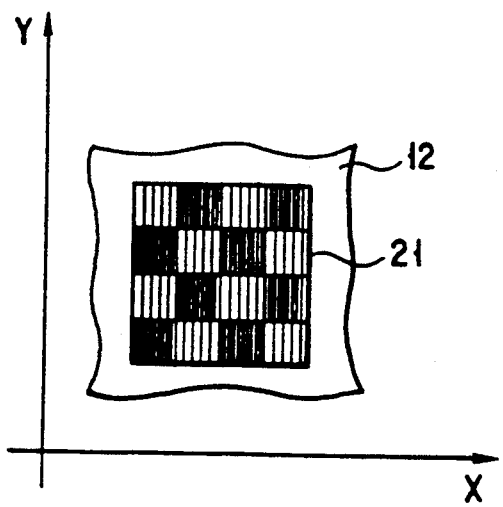
FIG. 14 is a view showing a state that a mark element is formed by use of one of the patterns of FIG. 12.

According to the present invention, one pattern is selected from the patterns Pk to Pp, and used in a mark element 21 in a state as shown in FIG. 14. In 16 fine square regions formed by dividing the mark element 21, the basic gratings Ge and Gf are alternately formed, so that the pattern Pk is formed. The very important point is that the pattern Pk is formed such that two basic gratings exist in the diameter of a light beam to be explained later. In other words, when the mark element 21 is irradiated with light for optical read, all types of gratings (not all gratings) must exist in the diameter of the light beam.

Figure 16:
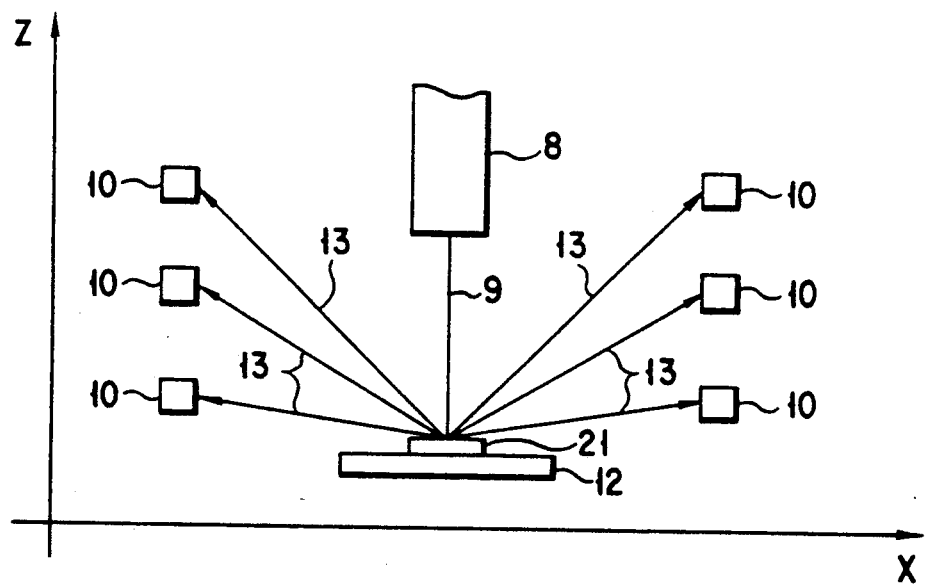
FIGS. 16 and 17 are a side view and a plane view, respectively, showing an outline of an apparatus for optically reading the pattern of the second embodiment of the present invention.
Figure 17:
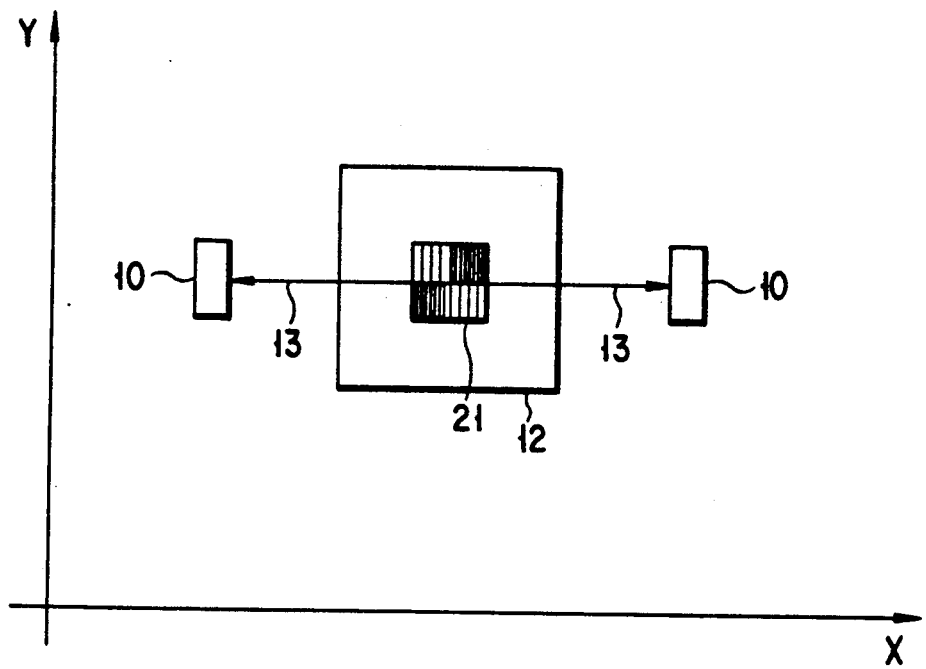

FIGS. 16 and 17 are a side view and a plane view, respectively, showing an outline of an apparatus for optically reading the pattern of the second embodiment of the present invention.

Similar to the apparatus shown in FIGS. 6 and 7, an object, for example, card 12 on which the mark element 21 is formed, is placed just below a laser oscillator 8. A laser beam 9 is perpendicularly radiated on the mark element 21 from the laser oscillator 8, and its diffracted light 13 is detected by sensors, such as photodiodes 10. The directions of the three basic gratings Ge to Gg of the patterns of the second embodiment are the same, and the spatial frequencies are different from each other. Therefore, the diffracted lights 13 due to the basic gratings Ge to Gg have substantially the same direction, and different diffraction angle shifted in a perpendicular direction. This is because the diffraction angle becomes larger as the spatial frequency of a grating grows larger, that is, the pitches of the lines are narrower. Therefore, six sensors are arranged in the same perpendicular plane.

According to the above embodiment, the sensors are arranged in accordance with three basic gratings Ge to Gg, so that six patterns Pk to Pp can be discriminated. For example, on the assumption that one mark element is formed of only one of the three basic gratings Ge to Gg and an identification mark is formed of a set of four mark elements, the number of the identification mark is $3^4$ on the basis of repeated permutation. In contrast, in a case where an identification mark is formed of a set of four mark elements by using the patterns of the second embodiment of the present invention, the number of the identification mark is $6^4$ on the basis of repeated permutation.

EXAMPLE 2

The mark element 21 having the pattern shown in FIG. 14 was formed on the card 12. The contour of the mark element 21 was a square of 2 mm × 2 mm. The size of the small squares in the pattern of the mark element 21 was 0.05 mm × 0.05 mm. The spatial frequencies of the gratings Ge and Gf were 700 line/mm, and 600 line/mm, respectively.

The mark element 21 was manufactured by the same method as in Example 1.

Figure 15:
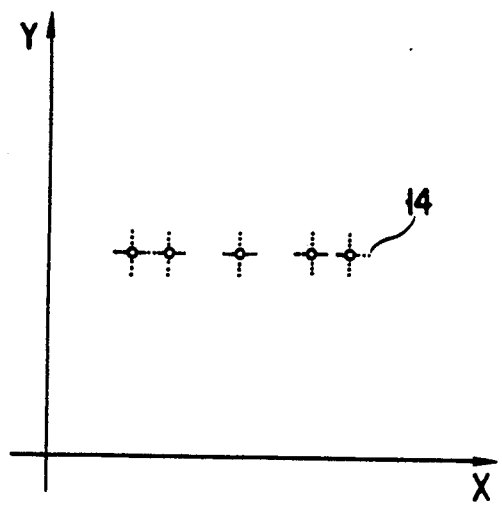
FIG. 15 is a view showing a diffracted light pattern derived from the pattern of the mark element of FIG. 14.

The diffracted light of the mark element 21 was obtained by the reading apparatus shown in FIGS. 16 and 17. The diffracted light pattern, which was seen from the cross section parallel to the plane of the mark element 21, was as shown in FIG. 15. In the drawing, reference numeral 14 is a light spot. The pattern discrimination was satisfactorily performed in using the mark element 21 in the reading apparatus.

Figure 18:
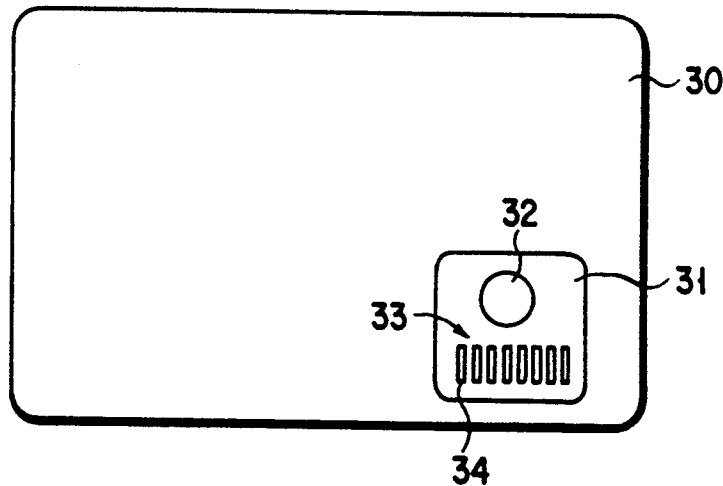
FIG. 18 is a plane view showing a card using an optical identification mark member according to the present invention.

FIG. 18 is a plane view showing a card 30 using an optical identification mark member according to the present invention. An identification mark member 31, which comprises a holographic sheet, is formed in the lower right portion of the card 30. A design 32 and an identification mark 33 are included in the member 31.

The identification mark 33 is formed of eight mark elements 34. For example, the patterns Pa to Pj shown in FIG. 2 can be used as the mark elements 34. If eight mark elements 34 are formed by using the patterns Pa to Pj, the number of the identification mark becomes an extremely large value of $10^8$ on the basis repeated permutation.

The above first and second embodiments explained the cases where only the primary diffracted light is detected. The present invention, however, can be applied to the detection of the secondary or more diffracted light. Also, the above embodiments are shown as the cases where the patterns of one mark element include at most two types of diffraction gratings. The present invention, however, can be applied to a case where diffraction gratings of three or more types are included in one mark element. Moreover, the first embodiment is explained as using only the change of the directions of the diffraction gratings, and the second embodiment is explained as using only the change of the spatial frequencies. However, according to the present invention, both the aspects can be combined.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An identification mark member having an identification mark optically readable by irradiating the mark with a light beam, and detecting diffracted light therefrom, comprising:
   at least one mark element included in said identification mark; and
   a pattern formed in said at least one mark element, wherein said pattern has at least two types of diffraction gratings, and wherein an arrangement of said at least two types of diffraction gratings is within a diameter of said light beam radiated on said mark element for optical read.

2. The identification mark member according to claim 1, wherein said types of gratings are determined by difference in direction of the grating.

3. The identification mark member according to claim 1, wherein said types of gratings are determined by difference in spatial frequency of the grating.

4. The identification mark member according to claim 1, wherein said mark element includes a plurality of fine regions whose sizes are the same, and said at least two types of diffraction gratings are substantially uniformly distributed such that only one type of diffraction grating exists in one region.

5. The identification mark member according to claim 4, wherein lines dividing said fine regions can not be optically detected.

6. The identification mark member according to claim 1, wherein said diffraction gratings are first and second gratings selected from a plurality types of basic gratings, said mark element is divided into a large number of first and second fine regions alternately arranged, only said first grating is formed in said first fine regions and only said second grating is formed in said second fine regions, at least one first fine region and one second fine region exist in the diameter of said light beam when light is radiated on said mark element for optical read.

7. The identification mark member according to claim 6, wherein said types of gratings are determined by difference in direction in grating.

8. The identification mark member according to claim 6, wherein said types of gratings are determined by difference in spatial frequency of the grating.

9. The identification mark member according to claim 6, wherein said fine regions are formed square.

10. The identification mark member according to claim 6, wherein lines dividing said fine regions can not be optically detected.

11. The identification mark member according to claim 1, wherein said light diffracted from said mark element is detected.

12. A card having an identification mark optically readable by irradiating the mark with a light beam, and detecting diffracted light therefrom, comprising:
    at least one mark element included in said identification mark; and
    a pattern formed in said at least one mark element, wherein said pattern has at least two types of diffraction gratings, and wherein an arrangement of said at least two types of diffraction gratings is within a diameter of said light beam radiating on said mark element for optical read.

13. The card according to claim 12, wherein said types of gratings are determined by difference in direction in grating.

14. The card according to claim 12, wherein said types of gratings are determined by difference in spatial frequency of the grating.

15. The card according to claim 12, wherein said mark element includes a plurality of fine regions whose sizes are the same, and said at least two types of diffraction gratings are substantially uniformly distributed such that only one type of diffraction grating exists in one region.

16. The card according to claim 15, wherein lines dividing said fine regions can not be optically detected.

17. The card according to claim 12, wherein said diffraction gratings are first and second gratings selected from a plurality types of basic gratings, said mark element is divided into a large number of first and second fine regions alternately arranged, only said first grating is formed in said first fine regions and only said second grating is formed in said second fine regions, at least one first fine region and at least one second fine region exist in the diameter of said light beam when light is radiated on said mark element for optical read.

18. The card according to claim 17, wherein said types of gratings are determined by difference in direction in grating.

19. The card according to claim 17, wherein said types of gratings are determined by difference in spatial frequency of the grating.

20. The card according to claim 17, wherein said fine regions are formed square.

21. The card according to claim 17, wherein lines dividing said fine regions can not be optically detected.

22. The card according to claim 12, wherein said light diffracted from said mark element is detected.

* * * * *